ELECTRIC PULSE GENERATORS

Filed May 26, 1954 2 Sheets-Sheet 1

INVENTOR
ALAN JOHN BAYLISS
BY
ATTORNEY

INVENTOR
ALAN JOHN BAYLISS
BY
ATTORNEY

United States Patent Office 2,787,708 Patented Apr. 2, 1957

2,787,708

ELECTRIC PULSE GENERATORS

Alan John Bayliss, Wembley, England, assignor to The General Electric Company Limited, London, England Application May 26, 1954, Serial No. 432,566

Claims priority, application Great Britain May 29, 1953

31 Claims. (Cl. 250—27)

The present invention relates to electric pulse generating apparatus.

For some purposes apparatus is required for generating a train of recurrent pulses having a predetermined recurrence frequency and any one of a number of different timings determined by the time of occurrence of a single trigger pulse applied to the apparatus. Or, according to another aspect, apparatus may be required to generate a train of recurrent pulses, the pulses of which are coincident in time with any selected one of a number of pulse trains which are applied to the apparatus as a composite pulse train consisting of all the said pulse trains interlaced with one another in time, all the said pulse trains having the same predetermined recurrence frequency, and the selection being effected by the application of a single trigger pulse coincident in time with one of the pulses of the selected pulse train.

These requirements arise for example in an automatic telephone exchange such as that described in copending United States patent appln. No. 395,391, in which a time division pulse multiplex unit is employed as a switch. In that exchange, the subscribers' lines are coupled through modulator/demodulator devices respectively to the multiplex unit and when setting up communication between two subscribers it is necessary first of all to apply to the modulator/demodulator of the calling subscriber, an unmodulated train of recurrent pulses having a timing identical with that of the pulse train corresponding to a free channel in the multiplex unit. It may be seen therefore that in this example apparatus is required as part of each subscriber's equipment, which apparatus can generate a pulse train having a timing coincident with that of any one of the channels of the multiplex unit. At the same time, test apparatus associated with the multiplex unit is provided which supplies a trigger pulse when required to this pulse generating apparatus, the trigger pulse being timed to coincide with a pulse of the pulse train of a selected free channel in the multiplex unit and determining the timing of the pulse train generated by the pulse generating apparatus so that it is identical with that of the selected free channel.

Electric pulse generating apparatus for these purposes is known, in which there is provided a master pulse generator, which generates a composite pulse train consisting of all the possible output pulse trains interlaced together in time with one another to form a single pulse train. In the common case, in which the different output pulse trains are spaced from one another in time by equal fractions *1/n* (where *n* is the number of different output pulse trains required) of the recurrence period of the output pulse trains (the recurrence period being equal to the reciprocal of the pulse recurrence frequency) the composite pulse train will simply be a suitably timed train of pulses recurring at a frequency equal to *n* times the recurrence frequency of the output pulse trains. The output from the master pulse generator is applied to the input of a gating circuit, which may be opened to pass signals from its input to its output either by the application of a trigger pulse or by the application of a pulse fed back to it by a loop circuit from the output of a pulse delay device. This pulse delay device has a delay time equal to the pulse recurrence period of the output pulse trains and its input is coupled to the output from the gating circuit. Thus if a trigger pulse is applied to the gating circuit at a time coincident with one pulse of the output from the master pulse generator, that one pulse is passed from the output of the gating circuit to the input of the delay device, and subsequently, after a delay equal to the recurrence period of the output pulse trains, is passed back through the loop circuit to open the gating circuit again thus permitting a further pulse from the master pulse generator to pass through to the input of the delay device. Following on this, the whole process is repeated and will continue indefinitely, pulses being passed through the gating circuit to the input of the delay device at intervals equal to the pulse recurrence period of the output pulse trains. The output from the gating circuit is also passed to the output terminals of the apparatus, and consists of a pulse train of the required recurrence frequency having a timing determined by the one applied trigger pulse.

It will be appreciated that the master pulse generator may be common to a number of pulse generating apparatus, or may form an integral part of the system in which the apparatus is included, so that according to another aspect the pulse generating apparatus may be considered to be the combination of the gating circuit and the delay device only, to which combination the trigger pulse and the output from the master pulse generator are applied in operation.

If it is required to change the timing of the output pulse train, the apparatus has to be "cleared" before the generation of the new pulse train may commence. This can be effected by preventing any pulse, which may be passing through the delay device at the moment of initiation of the clearing operation, from causing a further pulse to be passed to the input of the delay device, when the pulse in the delay device eventually appears at the output terminals. This might for example be effected by applying a clearing pulse of sufficient duration to the gating circuit, to prevent any signals passing through to the output of the gating circuit, and thus to the input of the delay device, until after a time at which it is impossible for any further pulse to appear at the output terminals of the delay device. The minimum possible duration of the clearing pulse is equal to the delay time of the delay device, since it is necessary to allow for a pulse just being applied to the input terminals of the delay device as the clearing operation is initiated. As a result of the clearing operation described above, the apparatus is paralyzed for a time, which is equal to a complete recurrence period of the output pulse trains. If the recurrence period is relatively high, this delay in operation of the pulse generating apparatus may be unacceptable, and in addition it is necessary to generate clearing pulses having an inconveniently long duration.

It is an object of the present invention to provide electric pulse generating apparatus for the same purpose as that described above, in which the pulse train generated may be changed without a delay arising when it is required to clear the apparatus of one pulse train and commence the generation of another of difference timing.

According to the present invention electric pulse generating apparatus for generating any selected one of *n* different pulse trains, where *n* is an integer greater than unity, each of recurrence frequency *f* but each having a different timing so that the pulses of the different trains do not overlap in time with one another, the selection being carried out by the application to the apparatus of a single trigger pulse at a time coinciding with the time position of a pulse of the selected train, comprises means for generating a master pulse train comprising all the $n$ pulse trains interlaced together in time, a time delay device adapted to deliver an electric pulse at its output terminals at a time $t$ equal to $l/f$ after the receipt of an electric pulse at its input terminals, a loop circuit interconnecting the output terminals of the delay device with the input terminals, the loop circuit including at least a gating circuit to which pulses derived from the output terminals of the delay device and from the master pulse generator are applied and which passes on a pulse towards the input terminals of the delay device only on coincidence in time of a pulse from the output terminals of the delay device and a pulse from the master pulse generator, means for applying trigger pulses to the loop circuit so that a pulse coincident in time with a trigger pulse applied to it is passed to the input terminals of the delay device, a control circuit responsive to the application of a trigger pulse for breaking the loop circuit and responsive also to the trailing edge of the first pulse appearing at the output terminals of the delay device after the application of a trigger pulse for completing the loop circuit again, and means for rendering said control circuit ineffective in respect of the first trigger pulse applied to the apparatus on commencing a period of operation.

According to another aspect of the present invention electric pulse generating apparatus for generating an output pulse train the pulses of which are coincident in time with any selected one of $n$ interlaced pulse trains of recurrence frequency $f$, the interlaced pulse trains being applied to the apparatus continuously in operation thereof and the selection being effected by the application to the apparatus of a single trigger pulse coincident in time with one of the pulses of the pulse train to be selected and remaining effective until a further selection is effected when required by the application of a further trigger pulse coincident in time with a pulse of a different selected one of the $n$ interlaced pulse trains, comprises a time delay device adapted to deliver an electric pulse at its output terminals at a time $t$ equal to $l/f$ after the receipt of an electric pulse at its input terminals, a loop circuit interconnecting the output terminals of the delay device with the input terminals, the loop circuit including at least a gating circuit to which pulses derived from the output terminals of the delay device and from the master pulse generator are applied and which passes on a pulse towards the input terminals of the delay device only on coincidence in time of a pulse from the output terminals of the delay device and a pulse from the master pulse generator, means for applying trigger pulses to the loop circuit so that a pulse coincident in time with a trigger pulse applied to it is passed to the input terminals of the delay device, a control circuit responsive to the application of a trigger pulse for breaking the loop circuit and responsive also to the trailing edge of the first pulse appearing at the output terminals of the delay device after the application of a trigger pulse for completing the loop circuit again, and means for rendering said control circuit ineffective in respect of the first trigger pulse applied to the apparatus on commencing a period of operation.

The said control circuit may be designed to make use of the fact that when the apparatus is in operation and generating a pulse train, pulses of this train occur simultaneously at the input and output terminals of the delay device. When, however, a further trigger pulse of a different timing from that of the pulses of the train being generated is applied to the apparatus in order to change the timing of the train generated, this further trigger pulse will cause the application of a further pulse to the input terminals of the delay device at the time of occurrence of which there will be no pulse at the output terminals of the delay device.

Thus the said control circuit may comprise a second gating circuit having input terminals, output terminals and a control terminal, the circuit being adapted to pass a pulse from its input terminals to its output terminals only in the absence of a pulse at the control terminal, means for applying an output from the first gating circuit to the input terminals of the second gating circuit, means for applying pulses derived from the output terminals of the delay device to the control terminal of the second gating circuit, a third gating circuit connected in the loop circuit and adapted to break or close the loop circuit in dependence upon the two respective states of a bistable trigger device, the bistable trigger device being triggered to the condition in which it breaks the loop circuit on application to it of a pulse from the output terminals of the second gating circuit and being triggered back to the other condition under the control of means responsive to the trailing edges of pulses derived from the output terminals of the delay device.

One example of electric pulse generating apparatus in accordance with the present invention will now be described with reference to the accompanying drawings, in which—

Figure 1:
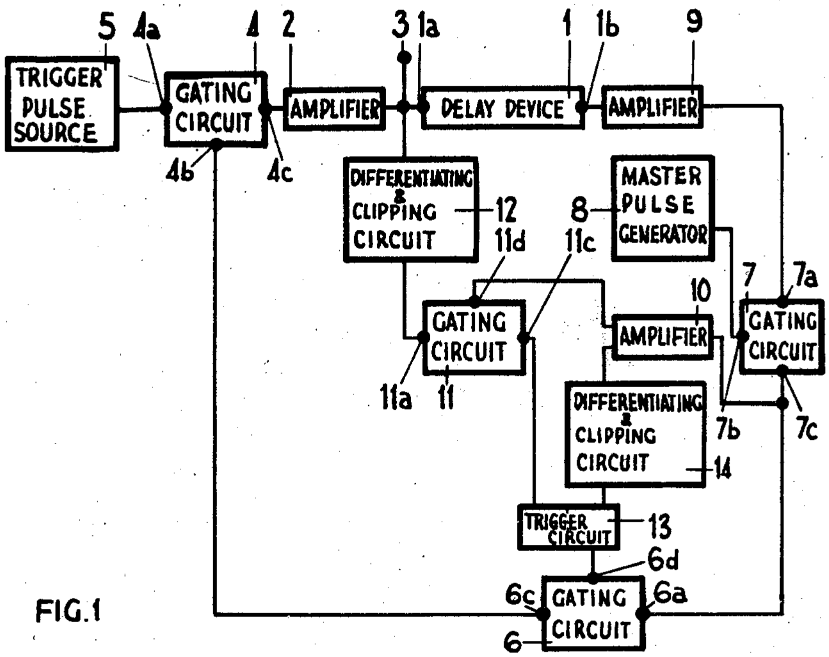
Figure 1 shows a block circuit diagram of the apparatus.

Referring first to Figure 1 of the accompanying drawings, the apparatus includes, as in the case of the known apparatus described previously, a delay device 1 having input terminals 1$a$ and output terminals 1$b$ and being adapted on application of an electric pulse to the input terminals 1$a$ to pass an electric pulse to its output terminals 1$b$ after a delay time $t$. In this case, as in the known apparatus previously described, the delay time $t$ is made equal to the reciprocal of the pulse recurrence frequency $f$ of the pulse trains which are generated in operation of the apparatus.

The input terminals 1$a$ of the delay device 1 are coupled to the output of an amplifier 2, the output of the amplifier 2 also being connected to the output terminal 3 of the apparatus. The input of the amplifier 2 is fed from a gating circuit 4 of a type such that on application of a pulse to either or both of its input terminals 4$a$ and 4$b$, a pulse is passed to its output terminal 4$c$ and thus to the input of the amplifier 2. Trigger pulses from the trigger pulse source 5 are applied to the apparatus at the input terminal 4$a$ of the gating circuit 4. The input terminal 4$b$ of the gating circuit 4 is coupled to the output terminal 6$c$ of a gating circuit 6 which is of a type such that signals may be passed from its input terminal 6$a$ to its output terminal 6$c$ depending on the value of a voltage applied to its control terminal 6$d$. The input terminal 6$a$ of the gating circuit 6 is connected to the output terminal 7$c$ of a gating circuit 7 which is of the type such that a pulse is passed to its output terminal 7$c$ only on coincidence of pulses at its two input terminals 7$a$ and 7$b$. The input terminals 7$b$ of the gating circuit 7 is connected to the output from a master pulse generator 8 and the other input terminal 7$a$ is connected to the output of an amplifier 9 the input of which is coupled to the output terminals 1$b$ of the delay device 1.

The output terminal 7$c$ of the gating circuit 7 is also connected to the input of an amplifier 10 one output from which is applied to the control terminal 11$d$ of a gating circuit 11. The input terminal 11$a$ of the gating circuit 11 is coupled through a differentiating and clipping circuit 12 to the output of the amplifier 2, whilst the output terminal 11$c$ of the gating circuit 11 is connected to one of the two trigger input terminals of a bistable trigger circuit 13. The other of the two trigger input terminals of the trigger circuit 13 is connected to a second output from the amplifier 10 through a further clipping and differentiating circuit 14. A control voltage derived from the trigger circuit 13 is applied to the control terminal 6*d* of the gating circuit 6.

The differentiating and clipping circuit 12 is arranged so that a short pulse coincident in time with the leading edge of any pulse applied to its input is passed from its output to the input terminal 11*a* of the gating circuit 11. The differentiating and clipping circuit 14 is arranged so that a short pulse coinciding with the trailing edge of any pulse applied to its input is passed to the secnod trigger input terminal of the trigger circuit 13. In addition the trigger circuit 13 is arranged so that, when it is in the state to which it is triggered by the application of a pulse from the circuit 14, the voltage applied to the control terminal 6*d* of the gating circuit 6 is such that signals may pass from the input terminal 6*a* to the output terminal 6*c*. When however the trigger circuit 13 is triggered to the other condition by the application of a pulse from the gating circuit 11, the control voltage applied to the terminal 6*d* blocks the gating circuit 6 so that signals cannot pass between its input and output terminals 6*a* and 6*c*.

The apparatus described with reference to Figure 1 operates as follows. Ignoring the gating circuit 6 for the moment and assuming it to be open to pass signals from the terminal 6*a* to the terminal 6*c*, the delay device 1 together with the loop circuit formed by the amplifier 9, the gating circuits 7 and 4 and the amplifier 2, and the associated trigger pulse source 5 and master pulse generator 8 form a pulse generator similar to the known one previously described in this specification. On application of a trigger pulse from the source 5 to the input terminal 4*a* of the gating circuit 4, the pulse is passed through the gating circuit 4 and the amplifier 2 to the input terminal 1*a* of the delay device 1. On appearing at the output terminal 1*b* this pulse is applied to the input of the amplifier 9, and from the output of the amplifier 9 to the input terminal 7*a* of the gating circuit 7.

The master pulse generator 8, which is coupled to the other input terminal 7*b* of the gating circuit 7, generates a pulse train which consists of all the possible output pulse trains interlaced together with one another in time. Where, as will be the common case, the output pulse trains are spaced from one another in time by equal integral fractions of the pulse recurrence period, the output from the master pulse generator will consist effectively of a single regularly recurrent pulse train having a recurrence period *l/n* of that of the output pulse trains, *n* being the number of different output pulse trains obtainable.

The trigger pulse from the trigger pulse source 5, when applied to the gating circuit 4, coincides in time with a pulse of the train which is to be selected from the interlaced pulse trains appearing at the output of the master pulse generator 8. Thus, since the delay time of the delay device 1 is equal to the recurrence period of the output pulse trains and also of the interlaced pulse trains generated by the master pulse generator 8, the delayed trigger pulse applied to the terminal 7*a* of the gating circuit 7 will coincide in time with the next pulse of the selected pulse train applied at terminal 7*b*. The gating circuit 7 will therefore open, since pulses are applied simultaneously to its two input terminals 7*a* and 7*b*, to pass a pulse to its output terminal 7*c*, and thence through the gating circuit 6 (assumed to be open) to the input terminal 4*b* of the gating circuit 4, which will open to pass it through the amplifier 2 to the input terminals 1*a* of the delay device 1. After a delay equal to the output pulse train recurrence period this pulse will be applied to the input terminal 7*a* of the gating circuit 7, releasing another pulse for application to the input terminals 1*a* of the delay device 1. This process, once started, will continue until some positive action is taken to break the continuous chain of events. The required output pulse train, as selected by the single applied trigger pulse, appears at the output terminal 3, which is coupled to the output of the amplifier 2. It will be appreciated however that the output terminal could equally well be coupled to any point on the loop circuit interconnecting the output and input terminals 1*a* and 1*b* of the delay device 1.

In distinction to the known apparatus, the pulse train generated by the apparatus being described can be changed merely by the application of a further trigger pulse of the required timing. No "clearing" pulse is required, nor is there any delay in commencing the generation of the new pulse train. Previously it has been assumed for the sake of explanation that the gating circuit 6 is open continuously. This condition holds except for a period immediately after the application of a further trigger pulse.

When a further trigger pulse is applied to the terminal 4*a* of the gating circuit 4, it is passed to the output terminal 4*c* and thence through the amplifier 2 to the delay device 1 in the normal way. At this instant, assuming the further trigger pulse to have a different timing to the original trigger pulse, there will be a pulse of the original pulse train in the delay device 1, and it is necessary to block the circuits consequent upon the appearance of this pulse at the terminals 1*b* without affecting the events similarly consequent upon the appearance of the further trigger pulse at the terminals 1*b*.

For this purpose, the further trigger pulse is applied to the differentiating and clipping circuit 12, which differentiates the pulse and clips the pulse corresponding to the trailing edge of the trigger pulse so that the output is a short pulse coinciding in time with the leading edge of the trigger pulse. This is applied to the input terminal 11*a* of the gating circuit 11, which, since there is no pulse applied to the control terminal 11*d* as will be explained, passes the appended pulse to its output terminal 11*c* and thence to one trigger input terminal of the trigger circuit 13. This pulse triggers the circuit 13 to the state in which it applies a potential to the terminal 6*d* such that the gating circuit 6 is blocked. This condition thus holds from the commencement of the further gating pulse.

When that pulse of the original pulse train, already in the delay device 1, appears at the output terminals 1*b* it is passed to the input terminal 7*a* of the gating circuit 7 and in the normal way a pulse appears at the output terminal 7*c*. This pulse cannot however pass the gating circuit 6, which, being closed, breaks the loop circuit connecting the terminals 1*b* and 1*a*. However the pulse from the terminal 7*c* is also applied to the amplifier 10, and thence to the differentiating and clipping circuit 14. The circuit 14 differentiates the applied pulse and clips that pulse corresponding to the leading edge of the applied pulse, so that a pulse coinciding in time with the trailing edge of the applied pulse is applied to the second trigger input terminal of the trigger circuit 13. This triggers the trigger circuit 13 to the condition, in which the potential applied to the terminal 6*d* is such as to leave the gating circuit 6 open. Thus the gating circuit 6 is closed from the time of occurrence of the leading edge of the further trigger pulse, until the time of occurrence of the trailing edge of the next pulse appearing at the output terminals 1*b* (i. e. the pulse of the original pulse train already in the delay device 1). When the further trigger pulse appears at the terminals 1*b*, the gating circuit 6 is open again and, the loop circuit being thus completed again, the generation of the further pulse train proceeds normally.

Since all pulses applied to the input terminals 1*a* of the delay device 1 are applied also to the input of the differentiating and clipping circuit 12, provision must also be made to prevent the trigger circuit 13 being triggered to the condition in which it closes the gating circuit 6, by any pulses other than further trigger pulses from the trigger pulse source 5, otherwise the generation of pulse trains would be impossible. This is done by applying an output from the amplifier 10 to the control terminal 11*d* so that the gating circuit 11 is closed, whenever a pulse appears at the output terminals 1*b* of the delay device 1. Since, during the generation of a pulse train, pulses always appear simultaneously at the terminals 1*b* and 1*a*, the gating circuit 11 will always be closed when a pulse is applied to the terminal 11*a*, except when a further trigger pulse is applied from the trigger pulse source 5. In this way only further trigger pulses cause any change in the state of the trigger circuit 13.

One further provision is necessary, and that is that the first trigger pulse applied from the trigger pulse source 5 after commencing operation should not result in the trigger circuit 13 being triggered to the state in which it closes the gating circuit 6. This is necessary since on that occasion, no pulse will be in the delay device 1 when the trigger pulse is applied, and the gating circuit 6 will remain closed until the time of occurrence of the trailing edge of the trigger pulse after it has been delayed in the delay device 1. This would prevent the generation of the required output pulse train. For this purpose a switch is provided in the apparatus, which is operated from first switching on until shortly after the application of the first trigger pulse, and which in some way prevents the trigger circuit 13 being triggered. For example, the switch could cause the application of continuous potential to the control terminal 11*d*, so as to close the gating circuit 11 for the relevant period of time, or alternatively a paralysing bias could be applied to the trigger circuit 13.

Figure 2:
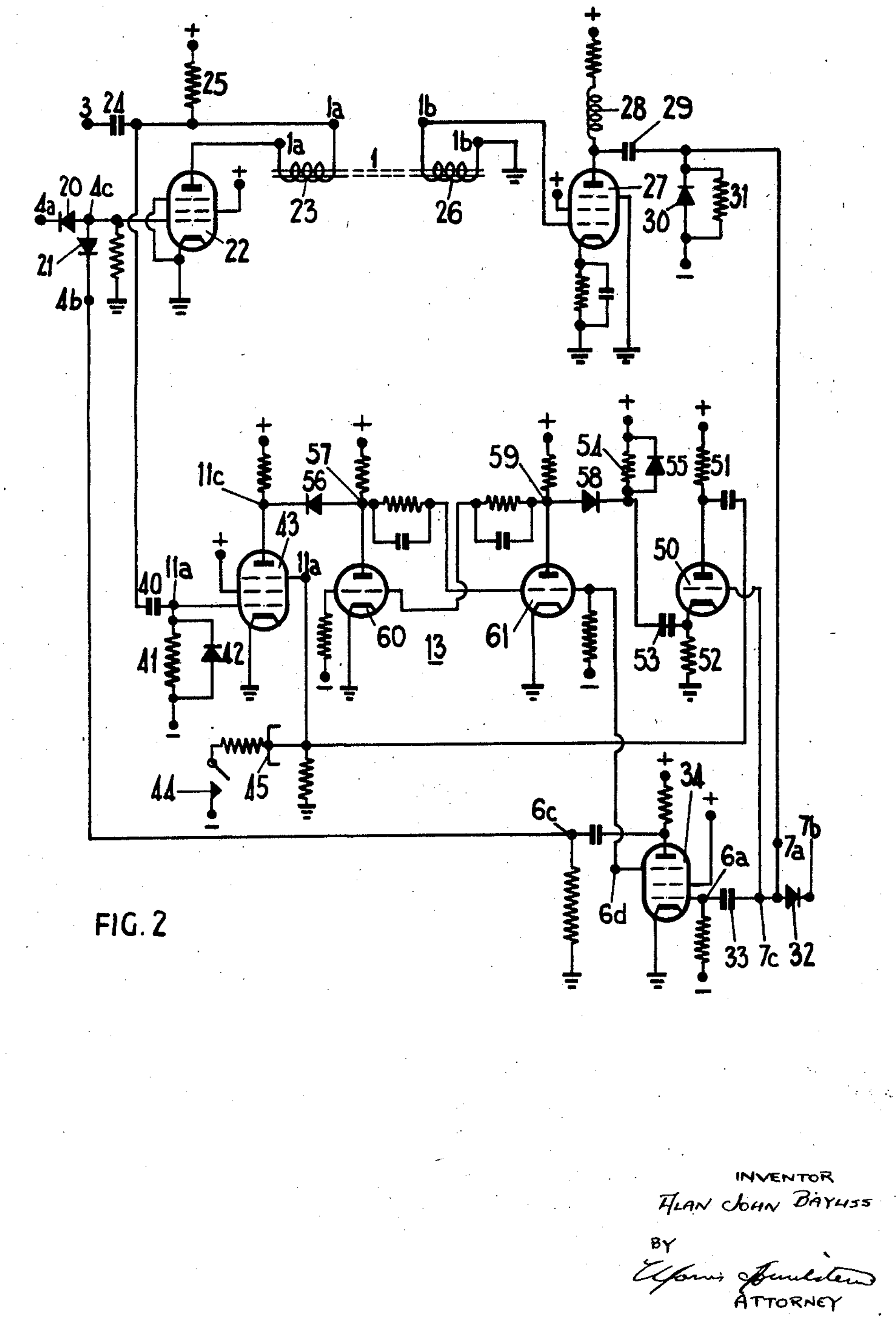
Figure 2 shows a detailed circuit diagram corresponding to the block circuit diagram of Figure 1.

Figure 2 of the accompanying drawings shows a detailed circuit diagram of one example of the circuits which may be employed in the various blocks described with reference to Figure 1 of the drawings. It will be appreciated that whilst these circuits incorporate thermionic valves and the delay device described is a magnetostrictive delay line, in other embodiments circuits employing cold cathode valves or transistors may be employed in some or all of the units, and other forms of delay device may be employed instead of the magnetostrictive delay line. The master pulse generator 8 and the trigger pulse source 5 of Figure 1 have not been shown in Figure 2.

Referring now to Figure 2 of the drawings, the gating circuit 4 (Figure 1) consists simply of a pair of germanium crystal rectifiers 20 and 21, one pair of poles of which are connected respectively to the input terminals 4*a* and 4*b* and the other pair of poles of which are connected together to the output terminal 4*c*. The polarity of the rectifiers 20 and 21 is arranged so that, if a negative pulse is applied to either of the terminals 4*a* or 4*b*, that pulse appears at the output terminal 4*c*. The output terminal 4*c* is connected to the control grid of a pentode thermionic valve 22. The valve 22 is connected conventionally as an amplifier, part of its anode load consisting of the input coil 23 of a magnetostrictive delay line which forms the delay device 1. The output from the apparatus is taken from across the terminal 3 and earth, a coupling capacitor 24 being connected between the terminal 3 and the common terminals of the coil 23 and the resistor 25, which latter forms the remainder of the anode load of the valve 22.

In Figure 2, many of the circuits shown are standard circuits, which are well-known, and the full details of some connections for example the connections between the positive high tension voltage supply and the anode circuits and screen grid circuits have not been shown, these connections being indicated by the sign + against the terminals concerned. In addition where points of the circuit are required to be connected to various positive or negative bias sources, these connections again are indicated by the signs + or − against the terminals to which the bias sources are connected. Thus in the case of the valve 22, the screen grid would be connected through a decoupling circuit to the positive high tension voltage supply line, and similarly the terminal of the resistor 25 remote from the valve 22 would be connected through a decoupling circuit to the positive H. T. voltage supply line.

The magnetostrictive delay line employed as the delay device 1 may consist simply of a bundle of fine nickel wires soldered together at their ends and earthed, and have its input and output terminals 1*a* and 1*b* connected respectively across coils 23 and 26 which each consist of a few turns encircling the bundle of nickel wires. The coils 23 and 26 are spaced apart along the wires so that when a pulse is applied across the input terminals 1*a*, a corresponding pulse appears across the terminal 1*b* after the required time delay, which in this apparatus is equal to the pulse recurrence period of the output pulse trains.

One of the output terminals 1*b* is earthed and the other is connected to the control grid of a pentode thermionic valve 27, which is connected in a conventional amplifier stage forming the amplifier 9 (Figure 1). The anode load of the valve 27 includes a peaking inductor 28 to increase the gain. An output coupling capacitor 29 is connected between the anode of the valve 27 and the input terminal 7*a* of the gating circuit 7 (Figure 1). A conventional direct current level restoration circuit, comprising the germanium crystal rectifier 30 and the resistor 31, connected in parallel between the terminal 7*a* and a negative bias potential source, is provided in order to determine accurately the D. C. level of the pulses applied to the terminal 7*a*.

The output from the master pulse generator 8 (Figure 1) is applied to the input terminal 7*b* to which is connected a germanium crystal rectifier 32, the polarity of which is so that its direction of maximum conductance is towards the terminal 7*b*. The pulses applied at both the input terminals 7*a* and 7*b* are positive-going, and an output pulse will appear at the output terminal 7*c* only when positive pulses coincide in time at the terminals 7*a* and 7*b*. Thus if a positive pulse is applied to the terminal 7*a* in the absence of a pulse at the terminal 7*b*, the rectifier 32 will provide a low impedance path to earth potential, and no pulse will appear at the terminal 7*c*. On the other hand if a positive pulse appears at the terminal 7*b* in the absence of a pulse at the terminal 7*a*, the rectifier 32 cannot conduct since the potential at the terminal 7*b* will be higher than that at the terminal 7*c* and again no pulse will appear at the terminal 7*c*. A coupling capacitor 33 is connected between the terminal 7*c* and the input terminal 6*a* of the gating circuit 6 (Figure 1), which is constituted by the circuit associated with the thermionic pentode valve 34, to the control grid of which terminal 6*a* is connected. The control terminal 6*d* is connected directly to the suppressor grid of the valve 34, which is otherwise connected conventionally as an amplifier. If a sufficient negative potential is applied to the control terminal 6*d*, the valve 34 becomes biassed beyond cut-off and pulses applied to the input terminal 6*a* do not appear at the output terminal 6*c* which is coupled to the anode of the valve 34. The output terminal 6*c* is connected directly to the input terminal 4*b* of the gating circuit 4.

As mentioned previously, it is arranged that the pulses applied to the terminals 4*a* and 4*b* are negative-going, and these will result in the appearance of positive-going pulses at the anode of the valve 22. The sense of the coils 23 and 26 is arranged so that negative-going pulses are applied to the control grid of the valve 27, the pulses appearing at the anode of the valve 27 thus being positive-going, as is required since positive-going pulses must be applied to the terminal 7*a*. The output of the gating circuit 7 will consist of positive-going pulses, and therefore, when the gating circuit 6 is open, negative-going pulses will appear at its anode and are then passed as negative-going pulses back to the input terminal 4*b*.

The differentiating and clipping circuit 12 consists of a capacitor 40, a resistor 41 and a germanium crystal rectifier 42, the capacitor 40 and resistor 41 constituting the differentiating circuit, and the rectifier 42 being included to effect the clipping. The free side of the capacitor 40 is connected to the anode circuit of the valve 22, so that positive-going pulses are applied to the circuit and as a result of the differentiating action a very short positive pulse is produced in response to the leading edge of an applied pulse and a very short negative pulse would be produced in response to the trailing edge, were it not for the presence of the rectifier 42, which becomes conducting and prevents the appearance of this pulse.

The input terminal 11*a* of the gating circuit 11 is connected to the common terminals of the capacitor 40 and the resistor 41. The gating circuit 11 includes a pentode thermionic valve 43, the input terminal 11*d* being connected to the suppressor grid of the valve 43. In the absence of a pulse applied to it from the amplifier 10 (Figure 1), the control terminal is normally near earth potential, and the valve 43 then acts as a conventional amplifier passing the pulses applied to its control grid to the output terminal 11*c* connected to the anode. When its is required to close the gating circuit 11, a negative potential must be applied to the terminal 11*d*, sufficient to bias the valve beyond cut-off. In the case of a further trigger pulse, this negative potential is in the form of a negative-going pulse from the amplifier 10, whilst at the beginning of operation, when it is required to close the gating circuit 11 whilst the first trigger pulse passes through the delay device 1, the contact 44 of a switch associated with the main switching arrangements of the apparatus in which the pulse generator is included, for example electronic exchange apparatus, is closed to apply a negative potential constantly to the terminal 11*d*. As indicated by the bus-bar connection 45 the contact 44 may be employed for this purpose in respect of all the pulse generators included in an electronic exchange.

The amplifier 10 (Figure 1) includes a triode thermionic valve 50 having both an anode load 51 and a cathode load 52. The pulses appearing at the output terminal 7*c* of the gating circuit 7 are positive-going, and are applied to the control grid of the triode 50, so that negative and positive pulses appear respectively at the anode and cathode of the valve 50. As described in the preceding paragraph, the negative-going pulses appearing at the anode are required for application to the control terminal 11*d* of the gating circuit 11, a suitable connection being provided.

The positive-going pulses appearing at the cathode of the valve 50 are applied to the differentiating and clipping circuit 14 (Figure 1) which includes the capacitor 53, the resistor 54 and the germanium crystal rectifier 55. The positive-going pulses applied to the circuit are differentiated, but the short positive-going pulses produced in response to the leading edges of the applied pulse are suppressed by the clipping action of the rectifier 55, which becomes conducting during these pulses, so that the output consists of short negative-going pulses coinciding in time with the trailing edges of the applied pulses.

The negative pulses appearing at the output terminal 11*c* of the gating circuit 11 are applied through a germanium crystal rectifier 56 to one trigger pulse input terminal 57 of the trigger circuit 13 whilst the negative pulses produced by the differentiating and clipping circuit 14 are applied through a germanium crystal rectifier 58 to the other trigger pulse input terminal 59 of the trigger circuit 13. The trigger circuit 13 includes a pair of thermionic triode valves 60 and 61 connected as a conventional bistable trigger circuit. On application of a negative impulse to the trigger input terminal 57, the trigger circuit 13 is triggered to the condition in which the triode 60 is conducting and the triode 61 is non-conducting, whilst the application of a negative impulse to the trigger input terminal 59 results in a change to the other condition in which the triode 61 is conducting and the triode 60 non-conducting. The control grid of the triode 61 is connected to the control terminal 6*d* of the gating circuit 6. When the triode 61 is conducting its control grid is at a potential near earth potential, whilst, after the application of a negative pulse to the input terminal 57 the control grid of the valve 61 falls to a large negative potential, which, applied to the suppressor grid of the valve 4, is sufficient to bias it beyond cut off, closing the gating circuit 6 and breaking the loop circuit interconnecting the output terminal 1*b* and the input terminal 1*a* of the delay device 1.

Figure 3:
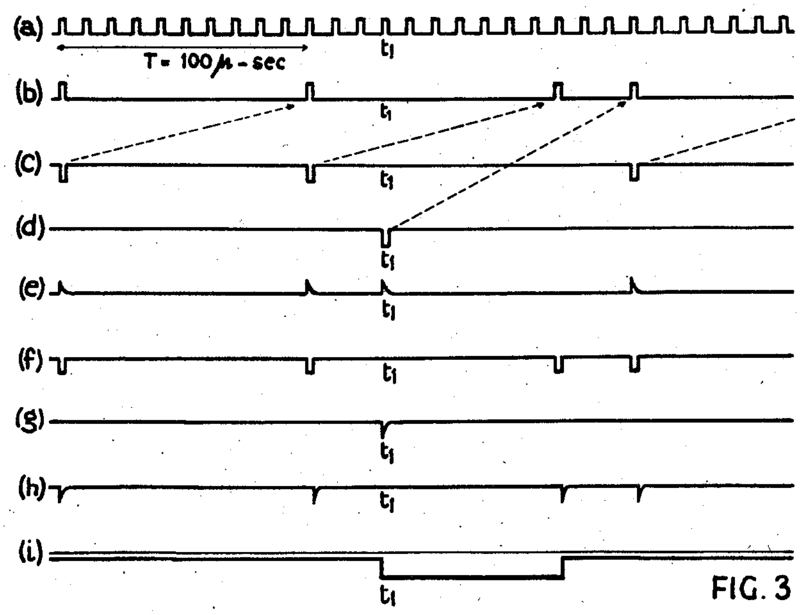
Figure 3 shows waveforms illustrating the operation of the apparatus.

Figure 3 of the accompanying drawings shows waveforms illustrating the operation of the apparatus shown in Figure 2, for a simple case in which the number of different output pulse trains required is only ten. In Figure 3 the waveforms are shown as a graph of voltage against time, the abscissae representing time and the ordinates voltage. The recurrence period $t$ of the output pulse trains, as indicated by the arrow under Figure 3(*a*) is 100 microseconds, whilst the duration of the pulses is 3 microseconds.

Figure 3(*a*) shows a waveform representing the output from the master pulse generator 8, this consisting of the single pulse train formed by all the required output pulse trains interlaced together with one another in time. In this case too, the output pulse trains are spaced from one another in time by equal fractions of the recurrence period, i. e. by 10 microseconds, so that the pulse train shown in Figure 3(*a*) is simply a regularly recurrent pulse train having a recurrence period of 10 microseconds. The waveforms illustrate the operation of the apparatus during a change from one pulse train to another, the further trigger pulse required for the change being applied at the time $t_1$ shown in Figures 3(*a*)–(*i*), the apparatus being assumed to be in operation generating a pulse train up to the time $t_1$.

The further trigger pulse is shown in Figure 3(*d*), which represents the waveform at the input terminal 4*a*. Figures 3(*b*) and (*c*) respectively illustrate the waveforms at the terminals 7*a* and 4*b*, the dotted arrows interlinking Figures 3(*c*) and (*d*) with Figure 3(*b*) representing the fact that the pulses at which the arrows originate in Figures (*c*) and (*d*) are passed through the delay device 1 and after being delayed consequently by 100 microseconds, result in the appearance at terminal 7*a* of the pulses shown in Figure 3(*b*) at the heads of the arrows.

Figure 3(*e*) shows the waveforms appearing at the input terminal 11*a* of the gating circuit 11, this being a short positive pulse coinciding in time with the leading edge of each pulse applied to either terminal 4*a* or 4*b* (Figures 3(*c*) and (*d*)).

Figure 3(*f*) shows a waveform appearing at the control terminal 11*d* of the gating circuit 11, this being a negative pulse coinciding in time with each output pulse from the gating circuit 11, which in this example may be taken as being the same pulses as appear in Figure 3(*b*). It will be seen on comparing Figures 3(*e*) and (*f*) that apart from the pulse in Figure 3(*e*) corresponding to the further trigger pulses, every pulse shown in Figure 3(*e*) coincides in time with a pulse shown in Figure 3(*f*) close the gating circuit 11, the only pulse of those shown in Figure 3(*e*) which is passed to the output terminal 11*c* is that corresponding to the further trigger pulse. The waveform at the terminal 11*c* is shown in Figure 3(*g*).

Figure 3(*i*) represents the potential at the control terminal 6*d* of the gating circuit 6, this terminal being just below earth potential when the triode 61 is conducting and considerably more negative when the triode 61 is non-conducting. The pulse appearing at terminal 11c, as shown in Figure 3(*g*), results in the trigger circuit 13 being triggered to the condition in which the triode 61 is non-conducting, and therefore, as shown in Figure 3(*i*), the potential at the terminal 6d becomes negative, thus closing the gating circuit 6 from a time coincident with the leading edge of the further trigger pulse (Figure 3(*d*)). The output from the differentiating and clipping circuit 14 is shown in Figure 3(*h*), and consists of a short negative pulse coinciding in time with the trailing edge of each of the pulses appearing at the terminal 7*c*. The first one of these pulses occurring after the further trigger pulse, triggers the trigger circuit 13 back to the condition in which the triode 61 is conducting, the potential at the terminal 6d (Figure 3(*i*)) thus being returned to its more positive value, and the gating circuit being opened. It can be seen however that the gating circuit 6 is closed at the time of occurrence of the third pulse in Figure 3(*b*), that pulse being the one already in the delay device 1 when the further trigger pulse was applied at the time $t_1$. However, the fourth pulse shown in Figure 3(*b*) is passed by the gating circuit 6, which has previously been returned to the open condition, that fourth pulse being the first one of the new pulse train which it is required to generate on receipt of the further trigger pulse.

It will be seen therefore that in this example, as in all embodiments of apparatus in accordance with the present invention, the new pulse train is generated from the moment of applying the further trigger pulse, and no delay is needed as in the known apparatus during which the apparatus is "cleared" of the old pulse train. In addition the change is effected by the application solely of the further trigger pulse, and no "clearing" pulse is required.

I claim:

1. Electric pulse generating apparatus of the kind for generating any selected one of $n$ different pulse trains, where $n$ is an integer greater than unity, each of recurrence frequency $f$ but each having a different timing so that the pulses of the different trains do not overlap in time with one another, the selection being carried out by the application to the apparatus of a single trigger pulse from a trigger pulse source at a time coinciding with the time position of a pulse of the selected train: said apparatus comprising means for generating a master pulse train comprising all the $n$ pulse trains interlaced together in time, a time delay device having input terminals and output terminals and adapted to deliver an electric pulse at its output terminals at a time $t$ equal to $1/f$ after the receipt of an electric pulse at its input terminals, a loop circuit interconnecting the output terminals of the delay device with the input terminals thereof and including at least a gating circuit having output terminals and two sets of input terminals and being adapted to pass a pulse to its output terminals on receipt of pulses simultaneously at the two sets of input terminals, means for coupling the output terminals of the delay device to one set of input terminals of the gating circuit, means for coupling an output from the master pulse train generator to the other set of input terminals of the gating circuit, means for coupling the output terminals of the gating circuit to the input terminals of the delay device, means for injecting trigger pulses applied to the apparatus from the trigger pulse source into the loop circuit so that they are passed to the input terminals of the delay device, a two-condition device in the loop circuit for permitting or blocking the passage of pulses through it from the output terminals to the input terminals of the delay device, a two-condition control circuit for determining the condition of the two-condition device, means responsive to the leading edge of a further trigger pulse for setting the control circuit to the condition in which the two-condition device blocks the passage of pulses, means responsive to the trailing edges of pulses occurring in the loop circuit between the output terminals of the delay device and the two-condition device for setting the control circuit to the condition in which the two-condition device permits the passage of pulses, and means for rendering said control circuit non-responsive to the first trigger pulse applied to the apparatus at the commencement of a period of operation.

2. Electric pulse generating apparatus according to claim 1 in which the pulses constituting each of the $n$ different pulse trains are spaced apart from one another in time by equal fractions $1/n$ of the pulse recurrence period of the output pulse trains, the interlaced pulse trains thus forming a single regularly recurrent pulse train of repetition frequency $nf$.

3. Electric pulse generating apparatus according to claim 1 in which the said control circuit comprises a second gating circuit having input terminals, output terminals and control terminals, the circuit being adapted to pass a pulse from its input terminals to its output terminals only in the absence of a pulse at the control terminals, means for applying an output from the first-mentioned gating circuit to the input terminals of the second gating circuit, means for applying pulses derived from the output terminals of the delay device to the control terminals of the second gating circuit, a third gating circuit connected in the loop circuit and adapted to break or close the loop circuit in dependence upon the two respective states of a bistable trigger device, the bistable trigger device being triggered to the condition in which it breaks the loop circuit on application to it of a pulse from the output terminals of the second gating circuit and being triggered back to the other condition under the control of means responsive to the trailing edges of pulses derived from the output terminals of the delay device.

4. Electric pulse generating apparatus according to claim 3 in which the means for rendering the control circuit non-responsive to the first trigger pulse applied to the apparatus on commencing a period of operation comprises means for applying a potential to close the second gating circuit continuously from the time of switching on at least until the time of the trailing edge of the first trigger pulse.

5. Electric pulse generating apparatus according to claim 3 in which said means for applying an output from the first-mentioned gating circuit to the input terminals of the second gating circuit includes a differentiating circuit for deriving two short pulses of opposite polarity in response respectively to the leading and trailing edge of an applied pulse, and a clipping circuit for eliminating the pulses corresponding to the trailing edges of the pulses applied from the first-mentioned gating circuit.

6. Electric pulse generating apparatus according to claim 3 in which said means responsive to the trailing edges of the pulses derived from the output terminals of the delay device includes a differentiating circuit for deriving two short pulses of opposite polarity in response respectively to the leading and trailing edges of an applied pulse, and a clipping circuit for eliminating the pulses corresponding to the leading edges of the pulses derived from the output terminals of the delay device.

7. Electric pulse generating apparatus according to claim 1 in which the delay device is a magnetostrictive delay line.

8. Electric pulse generating apparatus according to claim 7 in which the magnetostrictive delay line comprises a bundle of fine nickel wires soldered together at their ends and earthed.

9. Electric pulse generating apparatus of the kind for generating an output pulse train the pulses of which are coincident in time with any selected one of $n$ interlaced pulse trains of recurrence frequency $f$ where $n$ is an integer greater than unity, the interlaced pulse trains being applied to the apparatus continuously in operation thereof from a master pulse generator and the selection being effected by the application to the apparatus of a single trigger pulse from a trigger pulse source coincident in time with one of the pulses of the pulse train to be selected and remaining effective until a further selection is effected when required by the application of a further trigger pulse from the trigger pulse source coincident in time with a pulse of a different selected one of the $n$ interlaced pulse trains: said apparatus comprising a time delay device having input terminals and output terminals and adapted to deliver an electric pulse at its output terminals at a time $t$ equal to $1/f$ after the receipt of an electric pulse at its input terminals, a loop circuit interconnecting the output terminals of the delay device with the input terminals thereof and including at least a gating circuit having output terminals and two sets of input terminals and being adapted to pass a pulse to its output terminals on receipt of pulses simultaneously at the two sets of input terminals, means for coupling the output terminals of the delay device to one set of input terminals of the gating circuit, means for coupling an output from the master pulse train generator to the other set of input terminals of the gating circuit, means for coupling the output terminals of the gating circuit to the input terminals of the delay device, means for injecting trigger pulses applied to the apparatus from the trigger pulse source into the loop circuit so that they are passed to the input terminals of the delay device, a two-condition device in the loop circuit for permitting or blocking the passing of pulses through it from the output terminals to the input terminals of the delay device, a two-condition control circuit for determining the condition of the two-condition device, means responsive to the leading edge of a further trigger pulse for setting the control circuit to the condition in which the two-condition device blocks the passage of pulses, means responsive to the trailing edges of pulses occurring in the loop circuit between the output terminals of the delay device and the two-condition device for setting the control circuit to the condition in which the two-condition device permits the passage of pulses, and means for rendering said control circuit non-responsive to the first trigger pulse applied to the apparatus at the commencement of a period of operation.

10. Electric pulse generating apparatus according to claim 9 in which the pulses constituting each of the $n$ different pulse trains are spaced apart from one another in time by equal fractions $1/n$ of the pulse recurrence period of the output pulse trains, the interlaced pulse trains thus forming a single regularly recurrent pulse train of repetition frequency $nf$.

11. Electric pulse generating apparatus according to claim 9 in which the said control circuit comprises a second gating circuit having input terminals, output terminals and control terminals, the circuit being adapted to pass a pulse from its input terminals ot its output terminals only in the absence of a pulse at the control terminals, means for applying an output from the first-mentioned gating circuit to the input terminals of the second gating circuit, means for applying pulses derived from the output terminals of the delay device to the control terminals of the second gating circuit, a third gating circuit connected in the loop circuit and adapted to break or close the loop circuit in dependence upon the two respective states of a bistable trigger device, the bistable trigger device being triggered to the condition in which it breaks the loop circuit on application to it of a pulse from the output terminals of the second gating circuit and being triggered back to the other condition under the control of means responsive to the trailing edges of pulses derived from the output terminals of the delay device.

12. Electric pulse generating apparatus according to claim 11 in which the means for rendering the control circuit non-responsive to the first trigger pulse applied to the apparatus on commencing a period of operation comprises means for applying a potential to close the second gating circuit continuously from the time of switching on at least until the time of the trailing edge of the first trigger pulse.

13. Electric pulse generating apparatus according to claim 11 in which the means for applying an output from the first-mentioned gating circuit to the input terminals of the second gating circuit includes a differentiating circuit for deriving two short pulses of opposite polarity in response respectively to the leading and trailing edge of an applied pulse, and a clipping circuit for eliminating the pulses corresponding to the trailing edges of the pulses applied from the first-mentioned gating circuit.

14. Electric pulse generating apparatus according to claim 11 in which said means responsive to the trailing edges of the pulses derived from the output terminals of the delay device includes a differentiating circuit for deriving two short pulses of opposite polarity in response respectively to the leading and trailing edges of an applied pulse, and a clipping circuit for eliminating the pulses corresponding to the leading edges of the pulses derived from the output terminals of the delay device.

15. Electric pulse generating apparatus according to claim 9 in which the delay device is a magnetostrictive delay line.

16. Electric pulse generating apparatus according to claim 15 in which the magnetostrictive delay line comprises a bundle of fine nickel wires soldered together at their ends and earthed.

17. Electric pulse generating apparatus comprising a master pulse generator for generating a master pulse train comprising $n$ different pulse trains, where $n$ is an integer greater than unity, said generator including output terminals, each of the $n$ different pulse trains having the same pulse recurrence frequency $f$ but each having a different timing so that pulses of the $n$ different pulse trains do not overlap in time with one another, the $n$ different pulse trains being supplied to the output terminals of the master pulse generator as a single pulse train, the single pulse train comprising all the $n$ different pulse trains interlaced together in time, a time delay device having input terminals and output terminals so that a pulse is passed to the output terminals of the delay device at a time $t$ equal to $1/f$ after the application of a pulse to the input terminals thereof, a loop circuit interconnecting the output terminals of the delay device with the input terminals thereof which loop circuit includes at least a gating circuit having output terminals and two sets of input terminals, a pulse being passed from the output terminals thereof only when pulses are applied simultaneously to the two sets of input terminals, means for coupling the output terminals of the delay device to one set of input terminals of the gating circuit, means for coupling the output terminals of the master pulse generator to the other set of input terminals of the gating circuit, means for coupling the output terminals of the gating circuit to the input terminals of the delay device, the loop circuit also including output terminals of the apparatus to which terminals the pulse train generated in the loop circuit by the apparatus is passed, a two-condition device in the loop circuit for selectively permitting or blocking through it the passage of pulses from the output terminals of the delay device to the input terminals of the delay device in the loop circuit, means for injecting trigger pulses into the loop circuit at a point therein between the two-condition device and the input terminals of the delay device, each trigger pulse having a position in time which is the same as that of a pulse in the particular pulse train of the $n$ different pulse trains which it is desired, at the time of application of that trigger pulse, to generate at the said output terminals of the apparatus, and a control circuit to determine the condition of the two-condition device, the control circuit having two conditions, means responsive to the leading edge of a trigger pulse to set the control circuit to the condition in which the two-condition device is set to block the passage of pulses in the loop circuit, means responsive to the trailing edges of pulses occurring in the loop circuit between the output terminals of the delay device and the two-condition device to set the two-condition device when in the condition in which it blocks the passage of pulses in the loop circuit to the condition in which it permits the passage of pulses in the loop circuit, and means for rendering the control circuit non-responsive to the first trigger pulse applied to the apparatus after the commencement of a period of operation of the apparatus.

18. Electric pulse generating apparatus according to claim 17 wherein the pulses constituting each of the $n$ different pulse trains are spaced apart from one another in time by equal fractions $1/n$ of the pulse recurrence period $1/f$ of the pulse train to be generated, the master pulse train thus forming a single regularly recurring pulse train having a pulse recurrence frequency $nf$.

19. Electric pulse generating apparatus according to claim 17 wherein the control circuit comprises a second gating circuit having input terminals, output terminals and control terminals, the second gating circuit passing a pulse from its input terminals to its output terminals only in the absence of a pulse at the control terminal, means for applying pulses from the loop circuit between the two-condition device and the input terminals of the delay device to the input terminals of the second gating circuit, means for applying pulses derived from the loop circuit between the output terminals of the delay device and the two-condition device to the control terminals of the second gating circuit and a bistable trigger device having first and second sets of input terminals and a set of output terminals, the first set of input terminals being those to which a pulse is applied to set the bistable trigger device to a first stable condition, the second set of input terminals being those to which a pulse is applied to set the bistable trigger device to a second stable condition and the set of output terminals being terminals at which a first given voltage condition exists when the bistable trigger device is in the first stable condition and at which a sceond given voltage condition, different from the first given voltage condition, exists when the bistable trigger device is in the second stable condition, means having output terminals for deriving a pulse at those output terminals upon the occurrence of the trailing edge of each pulse in the loop circuit between the output terminals of the delay device and the two-condition device, means coupling the output terminals of the last said means to the first set of input terminals of the bistable trigger device, means coupling the output terminals of the second gating circuit to the second set of input terminals of the trigger device, the two-condition device being a third gating circuit, the third gating circuit having input terminals, control terminals and output terminals, means coupling the input terminals of the third gating circuit in the loop circuit to the output terminals of the delay device, means for applying the voltage condition which exists at the set of output terminals of the bistable trigger device to the control terminals of the third gating circuit, and means coupling the output terminals of the third gating circuit in the loop circuit to the input terminals of the delay device, the third gating circuit passing a pulse from its input terminals to its output terminals when the voltage condition which exists at its control terminals is said first given voltage condition, and blocking the passage of a pulse from its input terminals to its output terminals when the voltage condition which exists at its control terminals is said second given voltage condition.

20. Electric pulse generating apparatus according to claim 19 wherein the said means for rendering the control circuit non-responsive to the first trigger pulse to the apparatus after the commencement of a period of operation of the apparatus comprises means for applying a potential to the second gating circuit continuously from the commencement of a period of operation at least until the occurrence of the trailing edge of the first pulse in the loop circuit between the output terminals of the delay device and the third gating circuit, after the application of the said first trigger pulse, the second gating circuit being adapted to remain in the condition in which it permits the passage of pulses in the loop circuit for the period of the said potential.

21. Electric pulse generating apparatus according to claim 19 wherein the means for applying pulses derived from the loop circuit between the two-condition device and the input terminals of the delay device to the input terminals of the second gating circuit comprises means for deriving at a set of terminals pulses from the loop circuit between the two-condition device and the input terminals of the delay device, a differentiating circuit having input terminals and output terminals for differentiating pulses applied to the input terminals thereof and passing the resultant pulses to the output terminals thereof, means coupling the last mentioned set of terminals to the input terminals of the differentiating circuit, a clipping circuit having input terminals and output terminals, means coupling the output terminals of the differentiating circuit to the input terminals of the clipping circuit, the clipping circuit being arranged to pass to its output terminals only those pulses occurring at its input terminals which correspond to the leading edges of pulses occurring in the loop circuit between the two-condition device and the input terminals of the delay device, and means coupling the output terminals of the clipping circuit to the input terminals of the second gating circuit.

22. Electric pulse generating apparatus according to claim 19 wherein the means having output terminals for deriving a pulse at those output terminals upon the occurrence of the trailing edge of each pulse in the loop circuit between the output terminals of the delay device and the two-condition device comprises means for deriving at a set of terminals pulses from the loop circuit between the output terminals of the delay device and the two-condition device, a differentiating circuit having input terminals and output terminals for differentiating pulses applied to the input terminals thereof and passing the resultant pulses to the output terminals thereof, means coupling the last mentioned set of terminals to input terminals of the differentiating circuit, a clipping circuit having input terminals and output terminals, and means coupling the output terminals of the differentiating circuit to the input terminals of the clipping circuit, the clipping circuit being arranged to pass to its output terminals only those pulses occurring at its input terminals which correspond to the trailing edges of pulses occurring in the loop circuit between the output terminals of the relay device and the two-condition device, the said output terminals of the clipping circuit constituting the output terminals of the said means having output terminals for deriving a pulse at those output terminals upon the occurrence of the trailing edge of each pulse in the loop circuit between the output terminals of the delay device and two-condition device.

23. Electric pulse generating apparatus according to claim 17 wherein the delay device is a magnetostrictive delay line.

24. Electric pulse generating apparatus according to claim 23 wherein the magnetostrictive delay line comprises a bundle of fine nickel wires soldered together at their ends and earthed.

25. Electric pulse apparatus comprising a time delay device having input terminals and output terminals so that a pulse is passed to the output terminals of the delay device at a time $t$ after the application of a pulse to the input terminals thereof, a loop circuit interconnecting the output terminals of the delay device with the input terminals thereof which loop circuit includes at least a gating circuit having output terminals and two sets of input terminals, a pulse being passed from the output terminals thereof only when pulses are applied simultaneously to the two sets of input terminals, means for coupling the output terminals of the delay device to one set of input terminals of the gating circuit, means for receiving at the other set of input terminals of the gating circuit a pulse train, means for coupling the output terminals of the gating circuit to the input terminals of the delay device, the loop circuit also including output terminals of the apparatus to which terminals the pulse train generated in the loop circuit by the apparatus is passed, a two-condition device in the loop circuit for selectively permitting or blocking through it the passage of pulses from the output terminals of the delay device to the input terminals of the delay device in the loop circuit, means for injecting trigger pulses into the loop circuit at some point therein between the two-condition device and the input terminals of the delay device, a control circuit to determine the condition of the two-condition device, the control circuit having two conditions, means responsive to the leading edge of a trigger pulse to set the control circuit to the condition in which the two-condition device is set to block the passage of pulses in the loop circuit, means responsive to the trailing edges of pulses occurring in the loop circuit between the output terminals of the delay device and the two-condition device to set the two-condition device when in the condition in which it blocks the passage of pulses in the loop circuit to the condition in which it permits the passage of pulses in the loop circuit, and means for rendering the control circuit non-responsive to the first trigger pulse applied to the apparatus after the commencement of a period of operation of the apparatus.

26. Electric pulse apparatus according to claim 25 wherein the control circuit comprises a second gating circuit having input terminals, output terminals and control terminals, the second gating circuit passing a pulse from its input terminals to its output terminals only in the absence of a pulse at the control terminal, means for applying pulses derived from the loop circuit between the two-condition device and the input terminals of the delay device to the input terminals of the second gating circuit, means for applying pulses derived from the loop circuit between the output terminals of the delay device and the two-condition device to the control terminals of the second gating circuit, a bistable trigger device having first and second sets of input terminals and a set of output terminals, the first set of input terminals being those to which a pulse is applied to set the bistable trigger device to a first stable condition, the second set of input terminals being those to which a pulse is applied to set the bistable trigger device to a second stable condition and the set of output terminals being terminals at which a first given voltage condition exists when the bistable trigger device is in the first stable condition and at which a second given voltage condition, different from the first given voltage condition, exists when the bistable trigger device is in the second stable condition, means having output terminals for deriving a pulse at those output terminals upon the occurrence of the trailing edge of each pulse in the loop circuit between the output terminals of the delay device and the two-condition device, means coupling the output terminals of the last said means to the first set of input terminals of the bistable trigger device, means coupling the output terminals of the second gating circuit to the second set of input terminals of the trigger device, the two-condition device being a third gating circuit, the third gating circuit having input terminals, control terminals and output terminals, means coupling the input terminals of the third gating circuit in the loop circuit to the output terminals of the delay device, means for applying the voltage condition which exists at the set of output terminals of the bistable trigger device to the control terminals of the third gating circuit, and means coupling the output terminals of the third gating circuit in the loop circuit to the input terminals of the delay device, the third gating circuit passing a pulse from its input terminals to its output terminals when the voltage condition which exists at its control terminals is said first given voltage condition, and blocking the passage of a pulse from its input terminals to its output terminals when the voltage condition which exists at its control terminals is said second given voltage condition.

27. Electric pulse apparatus according to claim 26 wherein the means for rendering the control circuit non-responsive to the application of the first trigger pulse to the apparatus after the commencement of a period of operation of the apparatus comprises means for applying a potential to the second gating circuit continuously from the commencement of a period of operation at least until the occurrence of the trailing edge of the first pulse in the loop circuit between the output terminals of the delay device and the third gating circuit, after the application of the said first trigger pulse, the second gating circuit being adapted to remain in the condition in which it permits the passage of pulses in the loop circuit for the period of the said potential.

28. Electric pulse apparatus according to claim 26 wherein the means for applying pulses derived from the loop circuit between the two-condition device and the input terminals of the delay device to the input terminals of the second gating circuit comprises means for deriving at a set of terminals pulses from the loop circuit between the two-condition device and the input terminals of the delay device, a differentiating circuit having input terminals and output terminals for differentiating pulses applied to the input terminals thereof and passing the resultant pulses to the output terminals thereof, means coupling the last mentioned set of terminals to the input terminals of the differentiating circuit, a clipping circuit having input terminals and output terminals, means coupling the output terminals of the differentiating circuit to the input terminals of the clipping circuit, the clipping circuit being arranged to pass to its output terminals only those pulses occurring at its input terminals which correspond to the leading edges of pulses occurring in the loop circuit between the two-condition device and the input terminals of the delay device, and means coupling the output terminals of the clipping circuit to the input terminals of the second gating circuit.

29. Electric pulse apparatus according to claim 26 wherein the means having output terminals for deriving a pulse at those output terminals upon the occurrence of the trailing edge of each pulse in the loop circuit between the output terminals of the delay device and the two-condition device comprises means for deriving at a set of terminals pulses from the loop circuit between the output terminals of the delay device and the two-condition device, a differentiating circuit having input terminals and output terminals for differentiating pulses applied to the input terminals thereof and passing the resultant pulses to the output terminals thereof, means coupling the last mentioned set of terminals to input terminals of the differentiating circuit, a clipping circuit having input terminals and output terminals, and means coupling the output terminals of the differentiating circuit to the input terminals of the clipping circuit, the clipping circuit being arranged to pass to its output terminals only those pulses occurring at its input terminals which correspond to the trailing edges of pulses occurring in the loop circuit between the output terminals of the delay device and the two-condition device, the said output terminals of the clipping circuit constituting the output terminals of the said means having output terminals for deriving a pulse at those output terminals upon the occurrence of the trailing edge of each pulse in the loop circuit between the output terminals of the delay device and two-condition device.

30. Electric pulse apparatus according to claim 25 wherein the delay device is a magnetostrictive delay line.

31. Electric pulse apparatus according to claim 30 wherein the magnetostrictive delay line comprises a bundle of fine nickel wires soldered together at their ends and earthed.

No references cited.